3,446,820
SUBSTITUTED BENZOXAZOCINES AND INTERMEDIATES
Murle W. Klohs, Tarzana, and Francis J. Petracek, Agoura, Calif., assignors to Rexall Drug and Chemical Company, Los Angeles, Calif., a corporation of Delaware
No Drawing. Filed Apr. 3, 1967, Ser. No. 627,676
Int. Cl. C07d 87/54
U.S. Cl. 260—333    4 Claims

ABSTRACT OF THE DISCLOSURE

This invention is directed to 5-(3-amino-n-propyl)-1-phenyl - 1,3,4,6-tetrahydro-5H-benz[f]-2,5-oxazocines, to mono- and di-loweralkylamino equivalents thereof, and to 5 - (2-cyanoethyl)-1-phenyl - 1,3,4,6-tetrahydro-5H-benz[f]-2,5-oxazocine intermediates obtained in their synthesis. The final products have significant pharmacological activity as central nervous system depressants.

---

This invention relates to compositions of matter classified in the art of chemistry as substituted benzoxazocines and to intermediates obtained in the synthesis thereof.

The invention sought to be patented, in its final product composition aspect, is described as residing in the concept of a chemical compound having a molecular structure wherein there is attached to the 1,3,4,6-tetrahydro-5H-benz[f]-2,5-oxazocine nucleus at the 1-position a phenyl radical and to the nitrogen atom (5-position) a 3-amino-n-propyl substituent.

The invention sought to be patented, in its intermediate composition aspect, is described as residing in the concept of a chemical compound having a molecular structure wherein there is attached to the 1,3,4,6-tetrahydro-5H-benz[f]-2,5-oxazocine nucleus at the 1-position a phenyl radical and to the nitrogen atom (5-position) a 2-cyanoethyl substituent.

As used throughout the application the term "lower alkyl" embraces both straight and branched chain alkyl radicals containing from 1 to 6 carbon atoms, for example but without limitation, methyl, ethyl, n-propyl, isopropyl, n-butyl, tertbutyl, n-amyl, sec-amyl, n-hexyl, 2-ethylbutyl, 2,3-dimethylbutyl and the like, and the term "halo" embraces bromo, chloro, fluoro and iodo.

Infra-red ultra-violet spectral analysis, Nuclear Magnetic Resonance data and elemental analysis of the tangible embodiments of this invention in both its final product and intermediate composition aspects, taken together with the nature of the starting materials and mode of synthesis, positively confirm the structures of the compounds sought to be patented.

The tangible embodiments of this invention, in its final product composition aspect, possess the inherent applied use characteristics of having significant pharmacological activity, without demonstrable adverse toxicity, by exhibiting a central nervous system depression, as measured by protection against amphetamine toxicity (Lasagna and McCann, Science, 125:1241 (1957), that is qualitatively similar to that obtained in the same test with comparable doses of 5-(3-dimethylaminopropyl) - 10,11 - dihydro-5H-dibenz[b,f]azepine (imipramine) or 10,11-dihydro-N,N-dimethyl - 5H - dibenzo[a,d]cycloheptene-Δ⁵-δ-propylamine (amitriptyline). The tangible embodiments of this invention, in its intermediate composition aspect, are valuable as chemical intermediates in the synthesis of the tangible embodiments of this, in its final product composition aspect, by synthetic sequences as hereinafter described.

The manner and process of making and using the invention will now be generally described so as to enable one skilled in the art of chemistry to make and use the same as follows:

The following reaction sequence is illustrative of the preparation of the tangible embodiments of this invention in its intermediate and final product composition aspects:

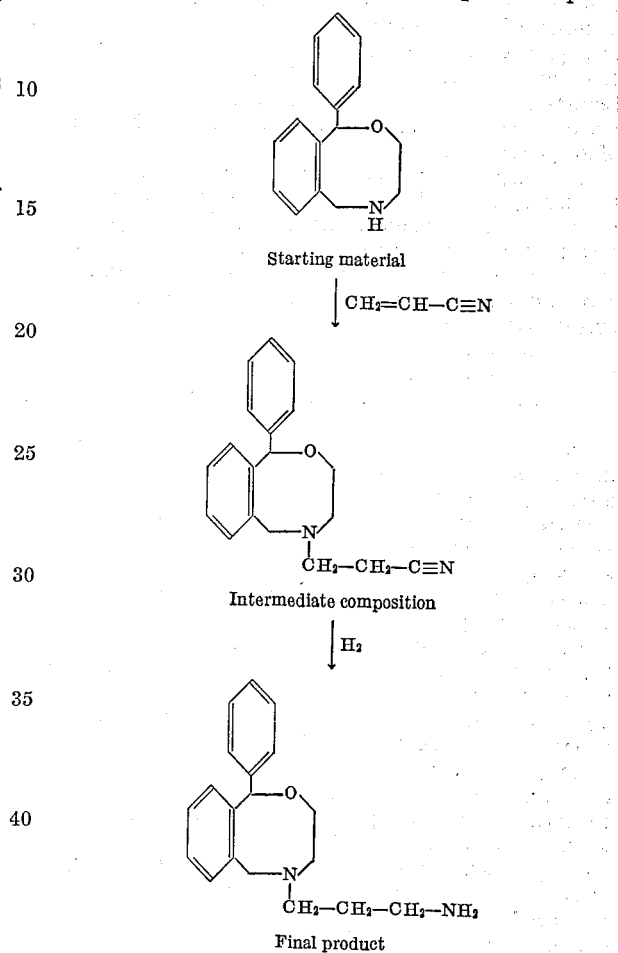

The starting materials for the preparation of the tangible embodiments of this invention are 1-phenyl-1,3,4,6-tetrahydro-5H-benz[f]-2,5-oxazocines that are conveniently prepared by subjecting an N-(2-hydroxyethyl)-3-phenyl-1-phthalanamine to low pressure hydrogenation in the presence of a suitable catalyst such as, for example, palladium over carbon, platinum or Raney nickel, and in an alcoholic solvent medium such as, for example, methanol, ethanol and the like, thereby to yield an N-[(2-hydroxyethyl)amino]methylbenzhydrol which in turn is converted to a 1-phenyl-1,3,4,6-tetrahydro-5H-benz[f]-2,5-oxazocine by ring closure through treatment with p-toluenesulfonic acid in an inert solvent medium, such as benzene, o-xylene, toluene and the like, at a temperature of up to the reflux temperature of the solvent used.

In carrying out the above described reaction sequence, starting materials may be employed wherein the 1-phenyl radical and/or the phenyl portion of the benzoxazocine nucleus bears one or more lower alkyl, lower alkoxy, halo or trifluoromethyl substituents. Such starting materials are prepared by the same procedure as described above by using appropriately substituted N-(2-hydroxyethyl)-3-phenyl-1-phthalanamines, and are the full equivalents of the specific 1-phenyl-1,3,4,6-tetrahydro-5H-benz[f]-2,5-oxazocine starting material depicted in the above reaction sequence. Their use yields intermediates and final products bearing corresponding substitution. Such intermediates and final products have the same utility as the specific intermediate and final product depicted hereinabove and are included within the scope of this invention.

In addition, the amino radical of the 5-position 3-aminopropyl substituent in the final product may be readily converted to mono- or di-lower alkylamino radicals by methods readily known to those skilled in the art of chemistry for converting primary amines to mono- and di-lower alkyl derivatives thereof. Certain of these methods will be described in detail hereinafter. Such final products are the full equivalents of the specific 5-(3 - aminopropyl) - 1 - phenyl - 1,3,4,6 - tetrahydro - 5H-benz[f]-2,5-oxazocine final product depicted in the above reaction sequence and are included within the scope of the present invention.

According to the reaction sequence depicted above, the starting material is converted to the tangible embodiments of this invention, in its intermediate composition aspect, by treatment with acrylonitrile for several hours at reflux temperature. The reaction is conveniently carried out in the presence of an inert solvent, such as ethanol, or, if desired, the acrylonitrile itself may serve as the solvent. The 5-(2-cyanoethyl)-1-phenyl-1,3,4,6-tetrahydro-5H-benz[f]-2,5-oxazocine intermediate thus obtained is isolated and recovered by conventional techniques.

The 2-cyanoethyl substituent of the intermediate is then reduced to the 3-aminopropyl substituent by catalystic hydrogenation in the presence of an inert solvent, over an appropriate catalyst, such as, for example, Raney nickel, palladium over carbon, platinic oxide and the like at a temperature of up to about 80° C., thus yielding the tangible embodiment of this invention in its final product composition aspect.

The 5-(3-aminopropyl)-1-phenyl - 1,3,4,6 - tetrahydro-5H-benz[f]-2,5-oxazocine comprising the tangible embodiment of the invention in its final product composition aspect wherein the amino radical is unsubstituted is converted to equivalent 5-[3-(N,N-di-lower alkylamino)-propyl] - 1 - phenyl - 1,3,4,6-tetrahydro-5H-benz[f]-2,5-oxazocines by means of reductive alkylation through treatment with an appropriate aldehyde or ketone in the presence of an inert solvent and with the aid of a catalyst such as palladium over carbon. Where straight chain lower alkyl substitution on the amino nitrogen atom is desired, a straight chain aldehyde is employed, for example methyl substituents result from the use of formaldehyde, ethyl from acetaldehyde, propyl from propionaldehyde, n-butyl from butyraldehyde; where branched chain lower alkyl substitution is desired, with attachment to the nitrogen atom through a carbon atom removed from the point of branching by one or more carbon atoms, a branched chain aldehyde is empolyed, for example iso-butyl (—CH$_2$CH(CH$_3$)$_2$) substituents result from the use of butyraldehyde, iso-amyl (—CH$_2$CH$_2$CH(CH$_3$)$_2$)

from iso-valeraldehyde; and where branched chain lower alkyl substitution is desired with attachment to the nitrogen atom through the carbon atom forming the point of branching, a ketone is employed, for example isopropyl substituents result from the use of acetone, sec-butyl (—CH(CH$_3$)CH$_2$CH$_3$) from ethylmethylketone, sec-amyl (—CH(CH$_2$CH$_3$)$_2$) from diethyl ketone.

Where the desired compound is a 5-[3-(N-lower alkylamino)-propyl - 1 - phenyl-1,3,4,6-tetrahydro-5H-benz[f]-2,5-oxazocine conversion is accomplished by treating the 5 - (3 - aminopropyl) - 1 - phenyl-1,3,4,6-tetrahydro-5H-benz[f]-2,5-oxazocine with a lower alkyl, for example ethyl, ester of a chlorocarboxylic acid followed by reduction of the resulting intermediate with lithium aluminum hydride. When the N-methylamino radical is desired, a chloroformate ester is used; a chloroacetate ester is used to yield an N-ethylamino radical, and the like.

The products of the reactions are recovered by conventional techniques of isolation and purification.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids, and polybasic acids, such as the citrate, tartrate, maleats and malate. Pharmaceutically the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived and are included within the scope of this invention.

The tangible embodiments of this invention, in its final product composition aspect, either as free bases or in the form of a non-toxic pharmaceutically acceptable acid-addition or quaternary ammonium salt, can be combined with conventional pharmaceutical diluents and carriers to provide such dosage forms as tablets, suspensions, solutions, suppositories and the like.

The best mode contemplated by the inventors for carrying out the invention will now be set forth as follows:

EXAMPLE 1

(a) 5 - (2-cyanoethyl)-1-phenyl-1,3,4,6-tetrahydro - 5H-benz[f]-2,5-oxazocine 1-phenyl-1,3,4,6-tetrahydro - 5H-benz[f] - 2,5-oxazocine oxalate (52 g., 0.158 mole) is converted to the free base and refluxed for 16 hours with acrylonitrile (200 ml.) to yield a light brown oil which, after removal of excess nitrile, gives 46.4 g. of the cyanoethyl intermediate that is characterized in the form of its oxalate salt, M.P. 202–203° C.

Analysis.—Calculated for C$_{19}$H$_{20}$N$_2$O·C$_2$H$_2$O$_4$: C, 65.95; H, 5.80; O, 20.92; N, 7.53. Found: C, 66.28; H, 5.96; O, 20.99; N, 7.41.

(b) 5 - (3-amino-n-propyl)-1-phenyl-1,3,4,6-tetrahydro-5H-benz[f]-2,5-oxazocine

The nitrile, from Example 1a, (30 g., 0.10 mole) is dissolved in methanol (300 ml.) and the solution made acid with 9 N hydrochloric acid in methanol (50 ml.). Using 5% platinum on carbon catalyst (5 g.), the solution is hydrogenated for 72 hours. The reaction yields 30 g. of an oil. The crude product is converted to the dihydrochloride, (19 g., 51%) which is obtained crystalline from isopropanol/acetone; M.P. 220/221° C.

Analysis.—Calculated for C$_{19}$H$_{24}$N$_2$O·2HCl: C, 61.79; H, 7.10; O, 4.33; N, 7.59; Cl, 19.19. Found: C, 61.61; H, 7.11; O, 4.38; N, 7.57; Cl, 19.14.

The following examples illustrate the preparation of tangible embodiments of this invention wherein one or both of the hydrogen atoms of the amine moiety have been replaced by a lower alkyl substituent.

EXAMPLE 2

(a) N - carbethoxy-5-(3-aminopropyl)-1-phenyl-1,3,4,6-tetrahydro-5H-benz[f]-2,5-oxazocine The primary amine dihydrochloride, from Example 1b, (5 g., 0.0135 mole) is reacted with an excess (2.5 g.) of ethyl chloroformate in chloroform/aqueous base solution (15 ml. chloroform, 50 ml. water and 2.5 g. sodium hydroxide). The reaction yields both a basic fraction and a neutral fraction. The basic fraction is separated out and used in the next step without further purification.

(b) 5 - [3-(N-methylamino)propyl] - 1 - phenyl-1,3,4,6-tetrahydro-5H-benz[f]-2,5-oxazocine The basic fraction, obtained in Example 2a, is reduced with excess lithium aluminum hydride in tetrahydrofuran/ether at reflux temperature overnight. The product (1.5 g., 58%) is obtained in the form of its crystalline dihydrochloride M.P. 228–232° C. (dec.).

*Analysis.*—Calculated for $C_{20}H_{26}N_2O \cdot 2HCl \cdot H_2O$: C, 59.85; H, 7.53; O, 7.97; N, 6.98; Cl, 17.67. Found: C, 60.14; H, 7.20; O, 7.79; N, 6.87; Cl, 18.05.

EXAMPLE 3

5 - [3-(N,N-dimethylamino)propyl] - 1 - phenyl-1,3,4,6-tetrahydro-5H-benz[f]-2,5-oxazocine The primary amine dihydrochloride, from Example 1a, (9 g., 0.0244 mole) is converted to the free base and reductively methylated by means of formaldehyde and hydrogen over palladium on carbon. The product (79% yield) is recrystallized from isopropanol and characterized in the form of its dihydrochloride, M.P. 257–258° C.

*Analysis.*—Calculated for $C_{21}H_{28}N_2O \cdot 2HCl \cdot \frac{1}{3}$ IPA: C, 63.30; H, 7.89; O, 5.11; N, 6.71; Cl, 16.99. Found: C, 62.84; H, 7.75; O, 5.16; N, 7.08; Cl, 17.22.

The subject matter which the applicants regard as their invention is particularly pointed out and distinctly claimed as follows.

We claim:

1. 5 - (3-amino-n-propyl)-1-phenyl - 1,3,4,6-tetrahydro-5H-benz[f]-2,5-oxazocine.
2. 5 - [3-(N-methylamino)propyl]-1-phenyl - 1,3,4,6-tetrahydro-5H-benz[f]-2,5-oxazocine.
3. 5 - [3-(N,N-dimethylamino)propyl]-1-phenyl-1,3,4,6-tetrahydro-5H-benz[f]-2,5-oxazocine.
4. 5 - (2-cyanoethyl) - 1-phenyl-1,3,4,6-tetrahydro-5H-benz[f]-2,5-oxazocine.

References Cited

FOREIGN PATENTS 6,606,390  11/1966  Netherlands.

NORMA S. MILESTONE, *Primary Examiner.*

U.S. Cl. X.R.

260—570.6, 999